United States Patent Office 3,148,179
Patented Sept. 8, 1964

3,148,179
AZO DYES FROM 2-(O-AMINOPHENYL)-2,1,3-BENZOTRIAZOLES
Rudolph A. Carboni, Wilmington, Del., assignor to E. I. du Pont de Nemours and Company, Wilmington, Del., a corporation of Delaware
No Drawing. Filed May 4, 1962, Ser. No. 192,310
10 Claims. (Cl. 260—157)

This invention relates to new compositions of matter and to their preparation.

This application is a continuation-in-part of co-assigned application U.S. Serial No. 13,432, filed March 8, 1960, and now abandoned in favor of the continuation-in-part Serial No. 173,806, filed February 16, 1962. Both of these applications relate to certain new 2-(o-aminophenyl)-2,1,3-benzotriazoles and their preparation and disclose that when these benzotriazoles are diazotized and the resulting diazo compound is coupled with compounds having color-forming groups, there are obtained dyestuffs which possess light- and wash-fastness. The present invention deals with these new dyes.

The compositions of this invention correspond in structure to:

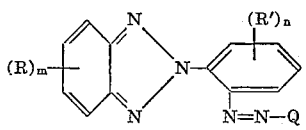

in which Q is a color-forming group, i.e., a monovalent organic radical such that the corresponding QH compound is capable of condensing with benzene diazonium chloride to form an azo dye; R and R', which may be the same or different, contain less than 19 carbons each and are selected from the group consisting of alkyl, alkoxy, an alkenylene group of the class consisting of butadienylene and benzbutadienylene which forms an extended aromatic structure with the benzo or 2-aryl ring, and an electronegative group, with the proviso that when R' is the electronegative group (—OH), it must not be o- or p- to the azo group, and m and n can be the same or different and are each cardinal numbers of less than 3; i.e. 0, 1, or 2. Of course when R and/or R' are an alkenylene group, m and/or n, as the case may be, must be 2.

In the above formula, the free valences on the benzo and 2-aryl rings which are not satisfied with R or R' substituents bear hydrogen.

Examples of alkyl groups containing less than 19 carbons are ethyl, propyl, hexyl, octyl, decyl, dodecyl, tetradecyl, octadecyl and the like. Suitable alkoxy groups include ethoxy, propoxy, butoxy, heptyloxy, decyloxy, tetradecyloxy, octadecyloxy, and the like. Illustrative electronegative radicals are halo (chlorine, fluorine, and bromine, i.e., halogen of atomic number 9–35), nitro, hydroxyl, sulfo, sulfo salts, carboxy, cyano and the like.

The Q radical is derived from any QH organic compound capable of condensing with benzene diazonium chloride to form an azo dye. Q may thus be defined as the monovalent radical or residue of a compound QH which reacts with benzene diazonium chloride to form an azo dye.

The definition of Q flows from the fact that the compounds

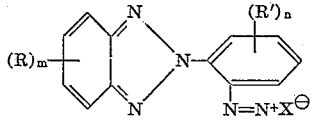

where R, R', m, and n have the previously indicated meanings and X is a halogen of atomic number 9–35, have the same capacity for coupling with color formers, i.e., QH compounds, as do the aryl diazonium salts. The coupling reactions of the aryl diazonium salts are well known and are discussed in detail by K. H. Saunders in "The Aromatic Diazo Compounds and Their Technical Applications," Edward Arnold and Co., London (1949), sec. ed., pp. 194–221, and H. H. Lubs, "The Chemistry of Synthetic Dyes and Pigments," Reinhold Publishing Company, New York (1955), sec. ed., pp. 97–111.

The definition of QH is based specifically on its ability to couple with benzene diazonium chloride partly because benzene diazonium chloride is the simplest and most readily available of the aryl diazonium chlorides and partly because such a definition points out that hydrocarbon compounds such as benzene and monoalkoxy benzene are not included among the color formers. Benzene and anisole, for example, will react with certain highly activated aryl diazonium halides but not with benzene diazonium chloride to form azo dyes.

The test to determine activity with benzene diazonium chloride may be conducted as follows:

Benzene diazonium chloride is prepared by treating one molar equivalent of aniline with 2.7 molecular equivalents of hydrogen chloride as a concentrated aqueous solution. The solution is cooled to 0° C. and treated with one molecular equivalent of sodium nitrite, dissolved in twice its weight of water. The addition of nitrite solution is carried out at a rate so that the temperature does not exceed 5° C. To ten milligrams of compound QH dissolved in one to two ml. of acetone, there is added about 0.25 g. of sodium acetate. One to three drops of the diazonium solution are then added to the text mixture. When QH contains an electron-donating group or is an active methylene compound, the addition of the benzene diazonium chloride causes immediate formation of an azo dye ranging in color from deep yellow to red-purple to green. An alternative method for expressing the result is that there is formed an azo compound having at least one absorption peak between 400 and 750 millimicrons.

QH compounds usefully employable in the present invention are of two kinds, namely, (1) those aromatic compounds containing electron-donating groups other than monoalkoxy and (2) compounds containing active methylene groups.

In QH compounds of type (1), Q is a monovalent aromatic group containing one or more electron donating groups and these compounds have a total resonance energy of not less than 20 kg. cal./mol. Resonance energies of organic compounds and the determination of resonance energy is shown by Linus Pauling in "The Nature of the Chemical Bond," sec. ed., Cornell University Press, 1945, pages 132–139. Q groups which are particularly suited are phenyl, naphthyl, anthryl, phenanthryl, benzpyryl, trypticyl, furyl, thienyl and pyrrolyl radicals which contain electron-donating groups, the term "electron-donating" being used in its art-recognized sense.

Specific usable QH compounds of the aromatic type are:

2,6-dimethylphenol;
1-acetyl-2-methyl-2-phenyl-hydrazine;
sodium 1-naphthol-2-sulfonate;
N-allyl-N-methylaniline;
N,N-dibenzylaniline;
N-cyclohexyl-N-methylaniline;
N-methyl-N-propargylaniline;
N,N-diethyl-alpha-naphthylamine;
N,N-di(beta-ethoxyethyl)aniline;
N,N-di(beta-acetoxyethyl)aniline, N,N-dimethylaniline;
N,N-dioctadecylaniline;
N-(beta-benzoyloxyethyl)-N-methylaniline;

3-methylsalicylamide of m-aminobenzaldehyde ethylene glycol acetal;
beta-(N-ethylanilino)ethyltrimethylammonium chloride;
beta-(N-dodecylanilino)ethyldimethylamine hydrochloride;
beta-(N-ethyl-alpha-naphthylamino)ethyltriethylammonium chloride;
and the like.

QH compounds containing active methylene groups, i.e., compounds of type (2), are those which contain the methylene group adjacent to a carbonyl or other strongly electron-attracting group. This methylene group is discussed by Saunders, op. cit., pp. 209–217, is mentioned by Lubs, op. cit., pp. 101–102, and is well known to workers in the azo dye art as a site of coupling reactions.

The 2-(o-aminophenyl)-2,1,3-benzotriazoles in which the benzo and/or phenyl ring bear R and R' substituents as defined above (other than —OH) may generally be prepared as described in the aforesaid copending applications, e.g., by starting with the correspondingly substituted o,o'-diaminoazobenzene or dibenzo-1,3a,4,6a-tetraazapentalene.

The 2-(o-aminophenyl)-2,1,3-benzotriazoles wherein R and/or R' is hydroxyl are conveniently made by nitrating the 2-(o-aminophenyl)-2,1,3-benzotriazole with nitric acid, acylating the thus nitrated benzotriazole with, e.g., acetic anhydride, reducing the nitro group with, e.g., nickel or palladium on charcoal, followed by diazotization and then hydrolysis with sodium carbonate. This method is exemplified by the following reaction sequence:

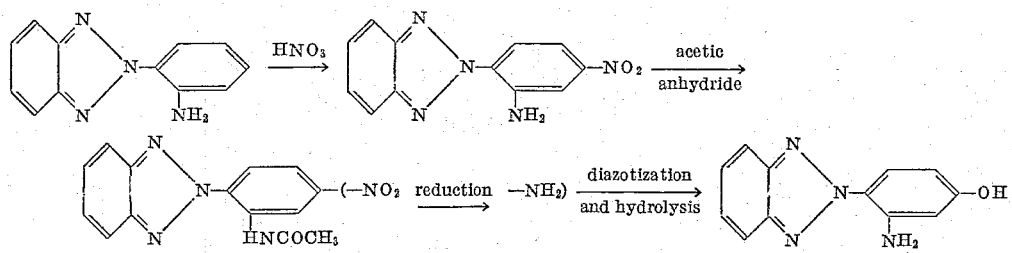

Compounds containing active methylene groups are at least partly aliphatic in nature. When the active methylene group is adjacent to a carbonyl group, the compound is capable of existing in tautomeric keto-enol form. Coupling in the process of the present invention is through the active methylene group, one of the hydrogens being displaced.

Specific QH compounds containing active methylene groups are acetoacetic ester and its amides; the ester, nitrile, amide, and mixed functions of malonic acid; acetylacetone; acetonedicarboxylic acid, its esters and amides; cyclic 1,3-diketones; beta-keto nitriles; beta-sulfonyl nitriles; cyanoacetic ester, cyanoacetamides; beta-nitro nitriles; beta-nitro esters; malononitrile dimer; 3-(2-furyl) acrolein; and the like.

The 2-(o-aminophenyl)-2,1,3-benzotriazoles which are diazotized are conveniently made by oxidizing an o,o'-diaminoazobenzene in a nitrogen-containing solvent, as described and claimed in the two copending applications noted above. In another method disclosed in the aforesaid applications, a dibenzo-1,3a,4,6a-tetraazapentalene is made to undergo reductive ring cleavage with a chemical reducing agent, such as, lithium aluminum hydride.

In a typical preparation, a solution of 2.2 g. (0.01 mole) of o,o'-diaminoazobenzene in 25 ml. of pyridine is added gradually to 6.4 g. (0.04 mole) of anhydrous cupric sulfate at room temperature with stirring. The mixture is then heated for one hour on a steam bath with stirring, cooled, and poured into four volumes of ice-water. The mixture is thereafter extracted with two 150 ml. portions of diethyl ether. The combined extract is decolorized with activated carbon, dried over anhydrous sodium sulfate, and evaporated to dryness. The yellow residual oil obtained solidifies to a crystalline mass on cooling. The solid is collected with the aid of petroleum ether and amounts to 1.3 g. This product melts at 97 to 98° C. and analyzes:

*Analysis*.—Calcd. for $C_{12}H_{10}N_4$: C, 68.55%; H, 4.79%; N, 26.65%. Found: C, 68.55%; H, 4.98%; N, 26.56%.

The ultraviolet spectrum shows maxima at 3570 A. ($\epsilon$9,650), 2960 A. ($\epsilon$12,000), 2680 A. ($\epsilon$6,300), and 2290 A. ($\epsilon$20,400).

The infrared spectrum shows bands at 2.98, 3.10, and 6.10$\mu$, which indicates the presence of the $NH_2$ function, and bands at 10.3$\mu$, characteristic of a 2-arylbenzotriazole.

The process of preparing the products of this invention is based on the well-known fact that diazonium salts react readily with QH compounds to form bright-colored products having the azo grouping —N=N—. The reaction by which these compounds are formed may be schematically represented as follows:

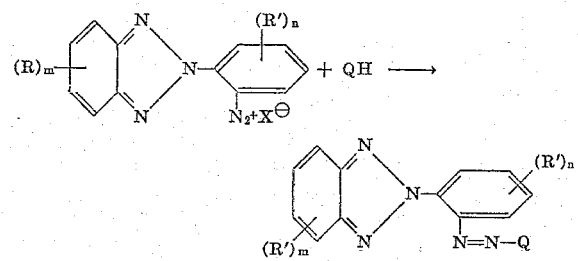

The formation of aromatic diazonium salts is well known (see Saunders, "The Aromatic Diazo Compounds and Their Technical Applications," Longmans, Green & Co., New York (1949), pp. 1–60).

2-(o-aminophenyl)-2,1,3-benzotriazole is a primary aromatic amine and its salts react with nitrous acid to form diazonium salts. The reaction may be schematically represented as follows:

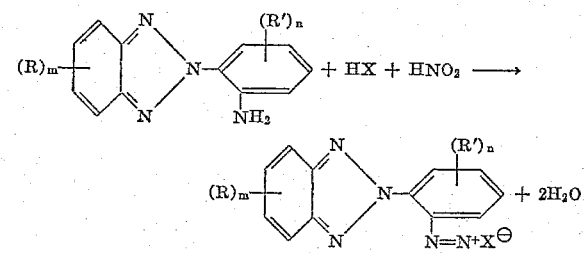

The diazotization is usually accomplished by adding a cold solution of sodium nitrite to a cold solution of the 2-(o-aminophenyl)-2,1,3-benzotriazole in aqueous halogen, e.g., hydrochloric, acid. The end-point of the reaction is conveniently determined by the detection of excess nitrous acid with potassium iodide-starch paper. An excess of mineral acid is necessary to prevent coupling of the diazonium salt and unreacted 2-(o-aminophenyl)-2,1,3-benzotriazole. Any excess nitrous acid is discharged by adding sulfamic acid or urea to the reaction mixture.

Generally, the resultant diazonium salt is left in solution preparatory to the coupling reaction.

The diazotization is conveniently conducted at temperatures of 0° to 25° C. in a medium such as aqueous hydrochloric acid, aqueous sulfuric acid, glacial acetic acid, etc. One of these may be used in conjunction with another solvent. A suitable medium is a mixture of glacial acetic and sulfuric acids, particularly one in which the amount of sulfuric acid is slightly more than equivalent to the quantity of the 2-(o-aminophenyl)-2,1,3-benzotriazole to be diazotized.

The coupling reaction is effected by adding the diazonium salt solution to a cold solution of the QH compound in water, alcohol, pyridine, or to a mixture of the QH compound in solutions containing sodium acetate, sodium carbonate, or sodium hydroxide. Pyridine or aqueous sodium acetate solutions are the preferred media for the QH compounds with activated methylenes.

Alternatively, the coupling reaction can be effected by adding the QH compound to the solution of the diazonium salt. Water or water-soluble alcohols are suitable media in which to effect the coupling reaction. For rapid completion of the coupling reaction, the medium should be basic.

The diazonium salt is employed in the coupling reaction in 1:1 or 2:1 molar proportions with respect to the QH compound, depending on the number of reactive sites present in the QH compound used. The use of two moles of diazonium salt per mole of QH compound to produce a 2:1 adduct is illustrated in Example VI.

The examples which follow illustrate but do not limit this invention.

EXAMPLE I

Diazotized 2 - (o - aminophenyl) - 2,1,3 - benzotriazole (0.01 mole), prepared as described in Example III, was added with stirring to a cold solution of 1.31 g. (0.01 mole) of N,N-dimethylaniline in 25 ml. of pyridine. After stirring for one hour, the reddish solid was collected by filtration and dried. Recrystallization from alcohol gave long, glistening orange-red crystals, M.P. 156–157° C.

*Analysis.*—Calcd. for $C_{20}H_{18}N_6$: C, 70.15%; H, 5.30%; N, 24.55%. Found: C, 70.55%; H, 5.43%; N, 24.34%.

The ultraviolet spectrum of the product, measured in methylene chloride, exhibited an absorption peak at 430 m$\mu$ ($\epsilon$ 25,680) and a shoulder at 310 m$\mu$ ($\epsilon$ 13,110). The product, 2-[o-(4-N-dimethylaminophenyl-1-ylazo)-phenyl]-2,1,3-benzotriazole, corresponds in structure to:

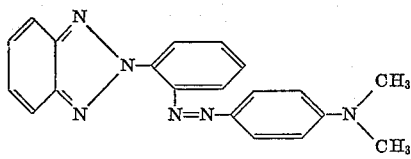

EXAMPLE II

Diazotized 2 - (o - aminophenyl) - 2,1,3 - benzotriazole (0.01 mole in 25 ml. aqueous hydrochloric acid solution), prepared as in Example III, was added with stirring to a cold solution of 1.44 g. (0.01 mole) of β-naphthol in 25 ml. of pyridine. After one hour of stirring, the red solid was collected by filtration and dried. Recrystallization from benzene yielded long, red needles, M.P. 226.8–227.6° C.

*Analysis.*—Calcd. for $C_{22}H_{15}N_5O$: C, 72.31%; H, 4.14%; N, 19.17%. Found: C, 72.43%; H, 4.18%; N, 19.56%.

The ultraviolet spectrum of the product in methylene chloride exhibits a broad band at 484 m$\mu$ ($\epsilon$ 18,925) (500 m$\mu$, $\epsilon$ 18,270) and a band at 312 m$\mu$ ($\epsilon$ 19,000). The product 2-[o-(2-hydroxynaphthalene - 1 - ylazo)-phenyl]-2,1,3-benzotriazole, corresponds in structure to:

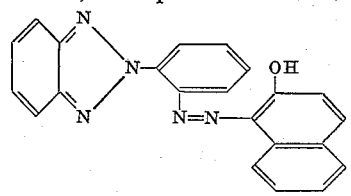

EXAMPLE III 2-(o-aminophenyl)-2,1,3-benzotriazole (10.5 g., 0.05 mole) in a mixture of 25 ml. of concentrated hydrochloric acid and 50 ml. of water was diazotized by treatment with 3.5 g. (0.05 mole) of sodium nitrate in 20 ml. of water at 5° C. The diazonium solution was added all at once to a cold stirred solution of 1-phenyl-3-methyl pyrazolone (8.7 g., 0.05 mole) in 150 ml. of pyridine. A yellow-orange solid separated. The mixture was stirred for an additional 1½ hours and then filtered. Recrystallization from dimethylformamide yielded long, orange-red crystals, M.P. 199–200.4° C. The yield was 15.3 g. (80%).

*Analysis.*—Calcd. for $C_{22}H_{17}N_7O$: C, 66.82%; H, 4.34%; N, 24.80%. Found: C, 65.67%; H, 4.18%; N, 24.85%.

The ultraviolet spectrum in ethanol exhibited absorption maxima at 402 m$\mu$ ($\epsilon$ 21,800); 312 m$\mu$ ($\epsilon$ 25,625), and 241 m$\mu$ ($\epsilon$ 25,350). The product, 2-[o-(3-methyl-1-phenyl - 5 - oxo-2-pyrazolin - 4 - ylazo)-phenyl]-2,1,3-benzotriazole, corresponds in structure to:

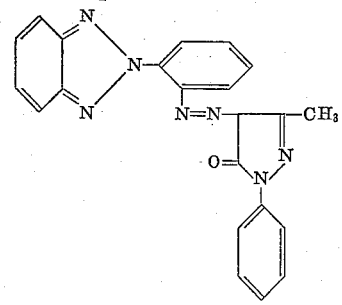

EXAMPLE IV 2-(o-aminophenyl)-2,1,3-benzotriazole (52.5 g., 0.25 mole) in 125 ml. of concentrated hydrochloric acid and 250 ml. of water was diazotized with an aqueous solution containing 17.5 g. (0.25 mole) of sodium nitrite. Addition of the diazonium solution to 58 g. (0.25 mole) of 1-phenyl-3-carbethoxy pyrazolone in a mixture of 750 ml. of pyridine and 200 g. of ice with stirring yielded a bright orange solid. Recrystallization from 2 liters of benzene yielded a first crop of 76 g. of product. Subsequent concentration of the mother liquor yielded an additional 22 g. of product. Total yield was 86.7%. The product melted at 188–189.2° C.

*Analysis.*—Calcd. for $C_{24}H_{19}N_7O_3$: C, 63.56%; H, 4.23%; N, 21.63%. Found: C, 63.87%; H, 4.31%.

The ultraviolet spectrum in methylene chloride showed absorption maxima at 422 m$\mu$ ($\epsilon$ 18,275) and 318 m$\mu$ ($\epsilon$ 12,040). The structure of the product, 2-[o-(3-carbethoxy - 1 - phenyl - 5 - oxo - 2 - pyrazolin - 4 - ylazo)-phenyl]-2,1,3-benzotriazole is:

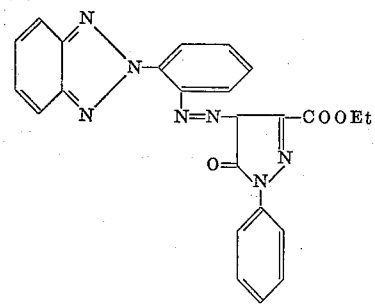

EXAMPLE V 2-(o-aminophenyl)-2,1,3-benzotriazole (2.1 g., 0.01 mole) in a cold mixture of 8 ml. of concentrated hydrochloric acid and 12 ml. of water was diazotized with 0.7 g. (0.01 mole) of sodium nitrite in 5 ml. of water at 0° to 5° C. After 15 minutes of stirring, the mixture was filtered to remove a small amount of insoluble solid. The solution was added rapidly to a cold, stirred mixture of 1.7 g. (0.015 mole) of m-phenylenediamine, 30.0 g. of sodium acetate, and 20 ml. of water. After stirring for ½ hour, the red mixture was filtered to collect the colored solid. The solid was crystallized from ethanol and recrystallized from 2:1 ethanol-water to obtain a well-defined orange-red crystalline product, M.P. 177–178.5° C.

Analysis.—Calcd. for $C_{18}H_{15}N_7$: C, 65.64%; H, 4.59%. Found: C, 65.92%; H, 5.07%.

The structure of the product, 2-[o-(2,4-diamino-1-azo)-phenyl]-2,1,3-benzotriazole, is:

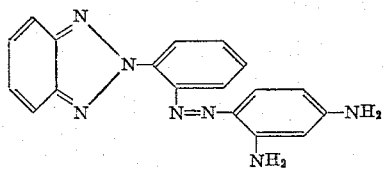

EXAMPLE VI

To a mixture of 5.0 g. (0.0125 mole) of 1,4-phenylene-bis[3-(5-oxo-1-phenyl-2-pyrazoline)] in 200 ml. of pyridine at 5° C. was added a solution of diazotized 2-(o-aminophenyl)-2,1,3-benzotriazole (5.3 g., 0.025 mole) in a mixture of 25 ml. concentrated hydrochloric acid and 50 ml. of water. The mixture was stirred at 10° C. for one hour. The insoluble red solid which separated was collected by filtration. The yield was quantitative. The structure of the product, 1,4-phenylene-bis-3[(5-oxo-1-phenyl-2-pyrazolin)-(4-ylazophenyl)-2,1,3-benzotriazole], is:

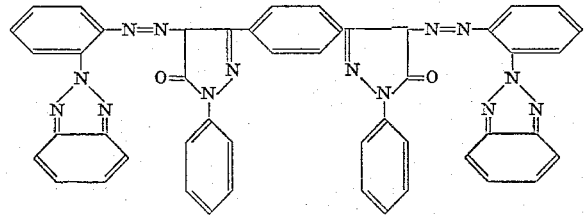

EXAMPLE VII 2-(o-aminophenyl)-2,1,3-benzotriazole (5.0 g., 0.024 mole) in a mixture of 20 ml. concentrated hydrochloric acid and 30 ml. water at 0° C. was diazotized with 1.6 g. (0.024 mole) of sodium nitrite in about 10 ml. of water. After ½ hour, the diazotized solution was added to a stirred solution containing 60 g. of sodium acetate in 500 ml. of water. Malononitrile (1.4 g., 0.02 mole) in water was then added. After 10 minutes, the yellow solid which separated from solution was collected by filtration. Recrystallization from dimethylformamide yielded bright yellow, hairlike crystals, M.P. 183–184.5° C. The yield was 3.6 g.

Analysis.—Calcd. for $C_{15}H_9N_7$: C, 62.71%; H, 3.16%; N, 34.13%. Found: C, 62.66%; H, 3.52%; N, 33.30%.

The ultraviolet spectrum showed absorption maxima at 450 mμ (ε 285), 400 mμ (ε 18,700), 387 mμ (ε 21,00).

The structure of the product, 2[o-(dicyanomethylazo)-phenyl]-2,1,3-benzotriazole, is:

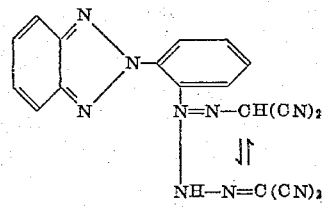

EXAMPLE VIII 2-(o-aminophenyl)-2,1,3-α,β-naphthotriazole (0.4 g.) in 5 ml. of concentrated hydrochloric acid and 5 ml. of water was diazotized with 0.1 g. of sodium nitrite as described in Example III. After 20 minutes, the diazonium salt was poured into a cold solution of 1-phenyl-3-carbethoxy pyrazolone (0.4 g.) in 20 ml. of pyridine. The yellow-orange solid which precipitated was collected by filtration, dried (0.65 g.), and recrystallized from benzene, M.P. 212° C. (incomplete melting). An additional recrystallization from dimethylformamide increased the melting point to 224° C.

Table I lists in the second and third columns diazonium salts of 2-(o-aminophenyl)-2,1,3-benzotriazoles and QH compounds, respectively, which may be used in the process of Example I to give the compounds listed in the fourth column. It is to be understood that the products derived from active methylene compounds may exist in an isomeric form, i.e.,

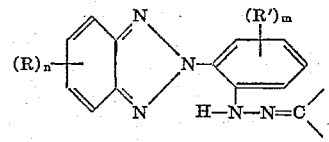

where R, R', m, and n have the already indicated meanings, in addition to the form indicated in the table.

*Table I*

| Example | Diazonium Compound | QH Compound | Product |
|---|---|---|---|
| 1 | (benzotriazole with COOH, N=N-Cl, COOH substituents) | phenol (OH) | (benzotriazole with COOH, N=N-phenyl-OH, COOH) |
| 2 | (benzotriazole with NO₂, NO₂, N=NCl) | N,N-dimethylaniline N(CH₃)₂ | (benzotriazole with NO₂, NO₂, N=N-phenyl-N(CH₃)₂) |

*Table I—Continued*
| Example | Diazonium Compound | QH Compound | Product |
|---|---|---|---|
| 3 | 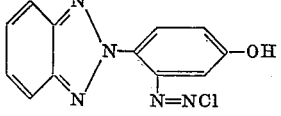 | 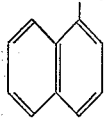 | 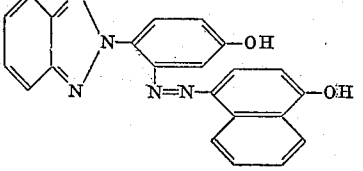 |
| 4 | 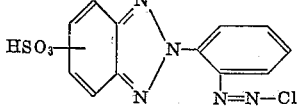 | 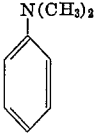 | 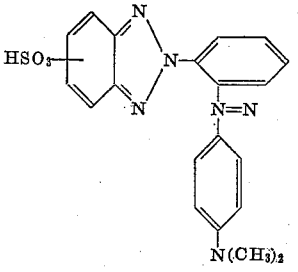 |
| 5 | 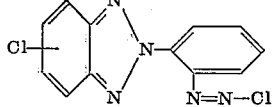 |  | 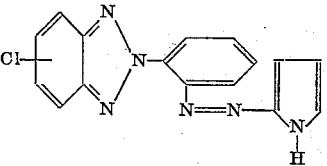 |
| 6 | 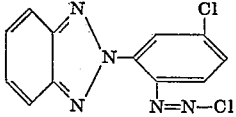 | 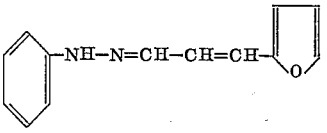 | 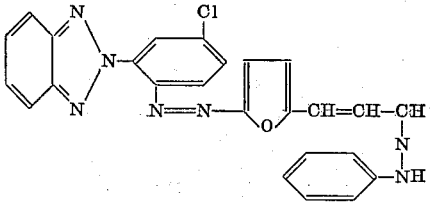 |
| 7 | 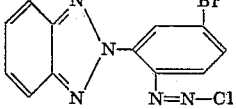 | 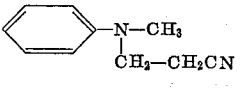 | 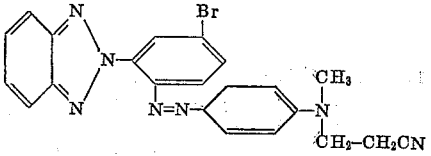 |
| 8 | 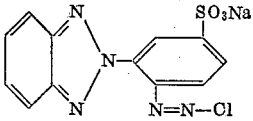 | 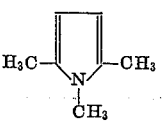 | 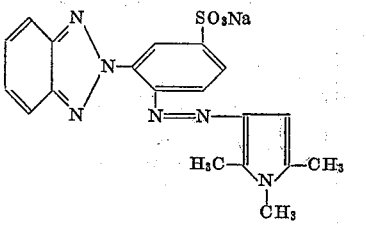 |
| 9 | 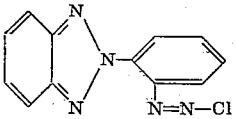 | 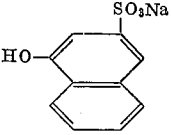 | 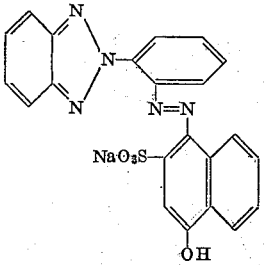 |
| 10 | 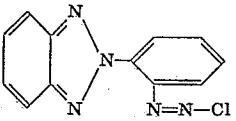 | 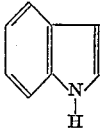 | 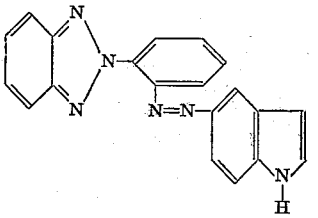 |

Table I—Continued

| Example | Diazonium Compound | QH Compound | Product |
|---|---|---|---|
| 11 | 2-(2-benzotriazolyl)phenyl diazonium chloride | m-(diethylamino)phenol; OH, N(C₂H₅)₂ | 2-[2-(benzotriazol-2-yl)phenylazo]-5-(diethylamino)phenol |
| 12 | 2-(2-benzotriazolyl)phenyl diazonium chloride | 1,3-dimethoxybenzene; OCH₃, OCH₃ | corresponding 2,4-dimethoxyphenylazo product |
| 13 | 2-(2-benzotriazolyl)phenyl diazonium chloride | CH₃—CO—CH₂—COOC₂H₅ | azo product with COCH₃, CH, COOC₂H₅ |
| 14 | 2-(2-benzotriazolyl)phenyl diazonium chloride | NC—CH₂—CN | azo product with CN, CN |
| 15 | 2-(2-benzotriazolyl)phenyl diazonium chloride | thiacyclohexane-2,6-dione (O=, S, =O) | corresponding azo product |
| 16 | 2-(2-benzotriazolyl)phenyl diazonium chloride | ethyl 3-oxotetrahydrothiophene-2-carboxylate (S, COOC₂H₅, H, O) | corresponding azo product; H₅C₂OOC |
| 17 | 2-(2-benzotriazolyl)phenyl diazonium chloride | CH₃SO₂CH₂CN | azo product with CN, C—H, H₃C—SO₂ |
| 18 | 2-(2-benzotriazolyl)phenyl diazonium chloride | H₅C₂OOC—CH₂—NO₂ | azo product with NO₂, C—H, COOC₂H₅ |
| 19 | 2-(2-benzotriazolyl)-4-cyanophenyl diazonium chloride | NC—CH₂—NO₂ | azo product with CN, NO₂, CH, CN |
| 20 | 2-(2-benzotriazolyl)phenyl diazonium chloride | C₂H₅OOC—CH₂—CH₂—C(=O)—COOC₂H₅ | corresponding azo product with COOC₂H₅, CH, H₂C—C=O, COOC₂H₅ |

Table I—Continued

| Example | Diazonium Compound | QH Compound | Product |
|---|---|---|---|
| 21 | 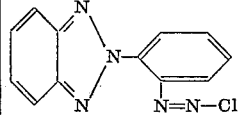 | C₂H₅OCO<br>\|<br>CH₂<br>\|<br>CONH₂ | 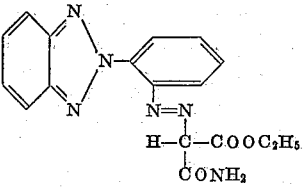 |
| 22 | 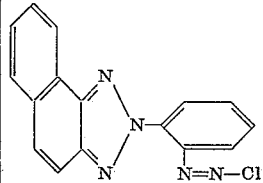 | N(CH₃)₂<br>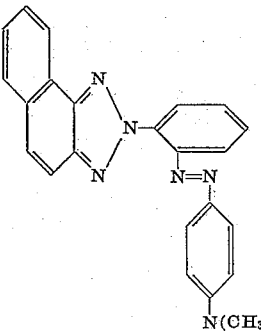 | 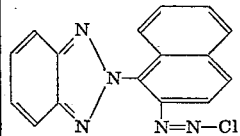 |
| 23 | 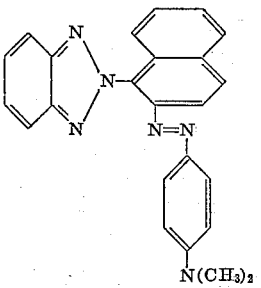 | N(CH₃)₂<br>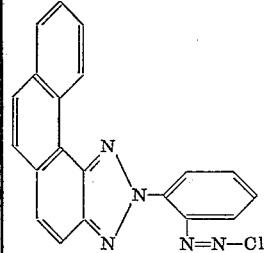 | 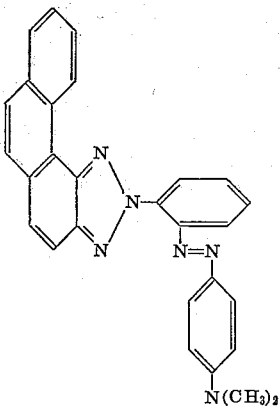 |
| 24 | 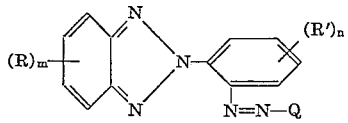 | N(CH₃)₂<br> | |

As was noted above, the compounds of this invention correspond to the formula:

(R)ₘ—[benzotriazole]—N—[aryl(R')ₙ]—N=N—Q

The preferred R and R' groups are chlorine, bromine, sulfo, SO₃Na, nitro, carboxy, cyano, lower alkyl (1 through 7 carbons), lower alkoxy (1 through 7 carbons) and butadienylene (the divalent radical which forms an extended aromatic structure with the benzo or 2-aryl ring), the electronegative groups being particularly preferred. Preferably, both m and n are zero.

The preferred Q groups of the aryl type are monovalent aromatic hydrocarbon or unsaturated heterocyclic groups of 1–2 rings. In particular, the preferred aromatic groups are those bearing 1–2 members of the group consisting of R₂″N—, R₂″N—N=CH—(CH=CH)ₙ—, R″O—, R″OC—, R″OOC—, (R″)(R‴)N—, R‴— and NaSO₃—, wherein R″ is hydrogen or hydrocarbon of up to 18 carbons free of acetylenic unsaturation, R‴ is hydrocarbon of up to 18 carbons free of acetylenic unsaturation, β-cyanoethyl or β-loweralkoxyethyl, and n is 0 or 1; and the preferred heterocyclic groups are those composed of 1–2 unsaturated rings containing a total of 1–2 hetero atoms of the class consisting of oxygen, sulfur and nitrogen, with the proviso that there is at most one oxygen or sulfur per ring, said rings being unsubstituted (other than hydrogen) or bearing 1–2 substituents as defined above for the aromatic hydrocarbon groups.

The preferred Q groups which contain active methylene groups are of the formula (B)(B′)CH—, wherein each of B and B′ is —CN, —NO₂, —COOR$^a$, —COR$^a$, —COOR$^a$, —CONR₂$^a$, —C(O)CH₂COOR$^a$ or —SO₂R$^a$, R$^a$ being hydrogen or lower alkyl (1 through 7 carbons).

The compounds of this invention are colored and are useful as dyestuffs in all applications where dyestuffs are known to be useful, such as coloring pigments for plastics, paints, and the like. They are also useful in the dyeing of textiles, as illustrated below.

Nylon fabric was immersed in a bath containing 1 g. of the dyestuff prepared as in Example III, in 400 ml. of water saturated with benzyl alcohol and 1%, based on the weight of the fabric, of the sodium salt of technical lauryl sulfate. The mixture was heated to boiling with stirring for one hour. Thereafter the nylon was removed from the bath, washed with warm water, and allowed to dry at room temperature. The dried nylon was dyed a brilliant yellow-orange in color. The dyed fabric had excellent wash- and light-fastness.

Following the above procedure, except that the dyestuff of Example I was used, there was obtained a fabric dyed a brilliant yellow-orange color which was very fast to washing and light.

Since obvious modifications and equivalents in the invention will be apparent to those skilled in the organic dye arts, I propose to be bound solely by the appended claims.

The embodiments of the invention in which an exclusive property or privilege is claimed are defined as follows:

1. A dye of the formula:

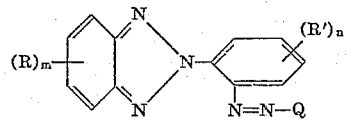

wherein
   Q is the monovalent organic radical of a compound QH containing an active methylene group,
   R and R' contain less than 19 carbons each and are selected from the group consisting of
      alkyl,
      alkoxy,
      an alkenylene group of the class consisting of butadienylene and benzbutadienylene which forms an extended aromatic structure with the ring to which it is attached, and
      an electronegative group of the class consisting of halogen of atomic number 9–35, nitro, hydroxyl, sulfo, sulfo salt, carboxy and cyano, any hydroxyl group bonded to the 2-aryl ring being in the meta position with respect to —N=N—Q, and $m$ and $n$ each represent a cardinal number less than 3.

2. A dye of the formula:

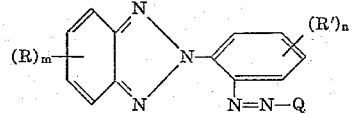

wherein
   Q is the monovalent organic radical of an aromatic compound QH containing an electron-donating group other than monoalkoxy benzene,
   R and R' contain less than 19 carbons each and are selected from the group consisting of
      alkyl,
      alkoxy,
      an alkenylene group of the class consisting of butadienylene and benzbutadienylene which forms an extended aromatic structure with the ring to which it is attached, and
      an electronegative group of the class consisting of halogen of atomic number 9–35, nitro, hydroxyl, sulfo, sulfo salt, carboxy and cyano, any hydroxyl group bonded to the 2-aryl ring being in the meta position with respect to —N=N—Q, and $m$ and $n$ each represents a cardinal number less than 3.

3. 2 - [o-(4-N-dimethylaminophenyl-1-ylazo)-phenyl]-2,1,3-benzotriazole.

4. 2 - [o-(2-hydroxynaphthalene-1-ylazo)-phenyl]-2,1,3-benzotriazole.

5. 2-[o-(3-methyl-1-phenyl-5-oxo-2-pyrazolin-4-ylazo)-phenyl]-2,1,3-benzotriazole.

6. 2 - [o-(3-carbethoxy-1-phenyl-5-oxo-2-pyrazolin-4-ylazo)-phenyl]-2,1,3-benzotriazole.

7. 2 - [o-(2,4-diamino-1-azo)-phenyl]-2,1,3-benzotriazole.

8. 1,4 - phenylene-bis-3[(5-oxo-1-phenyl-2-pyrazolin)-(4-ylazophenyl)-2,1,3-benzotriazole].

9. 2 - [o-(dicyanomethylazo)phenyl]-2,1,3-benzotriazole.

10. 1,4 - phenylene-bis-3[(5-oxo-1-phenyl-2-pyrazolin)-(4-ylazophenyl)-2,1,3-benzotriazole].

References Cited in the file of this patent

UNITED STATES PATENTS

| | | |
|---|---|---|
| 2,501,188 | Parker et al. | Mar. 21, 1950 |
| 2,817,659 | Bossard et al. | Dec. 24, 1957 |